June 19, 1945.   D. G. ROOS   2,378,504
TOWING DEVICE
Filed Nov. 26, 1943   2 Sheets-Sheet 1
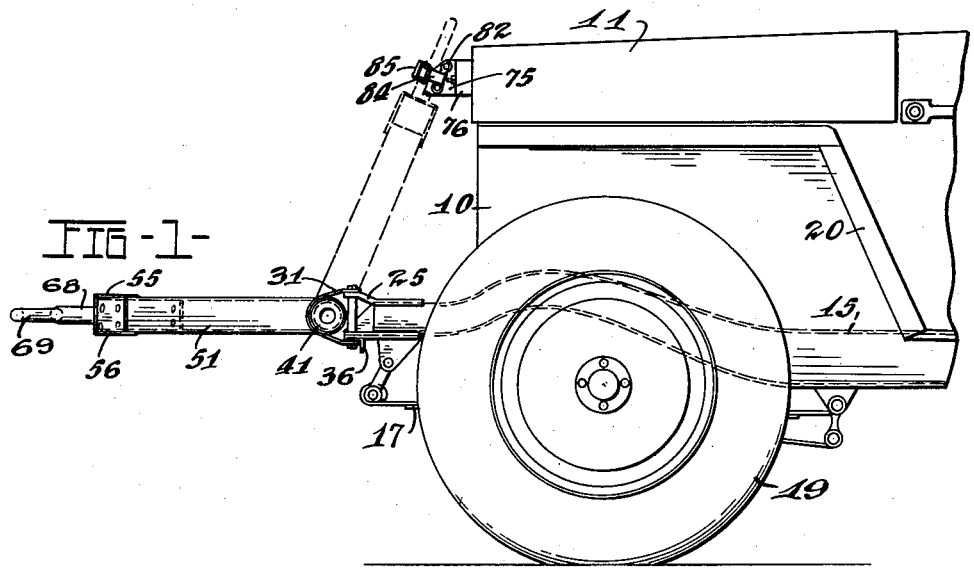
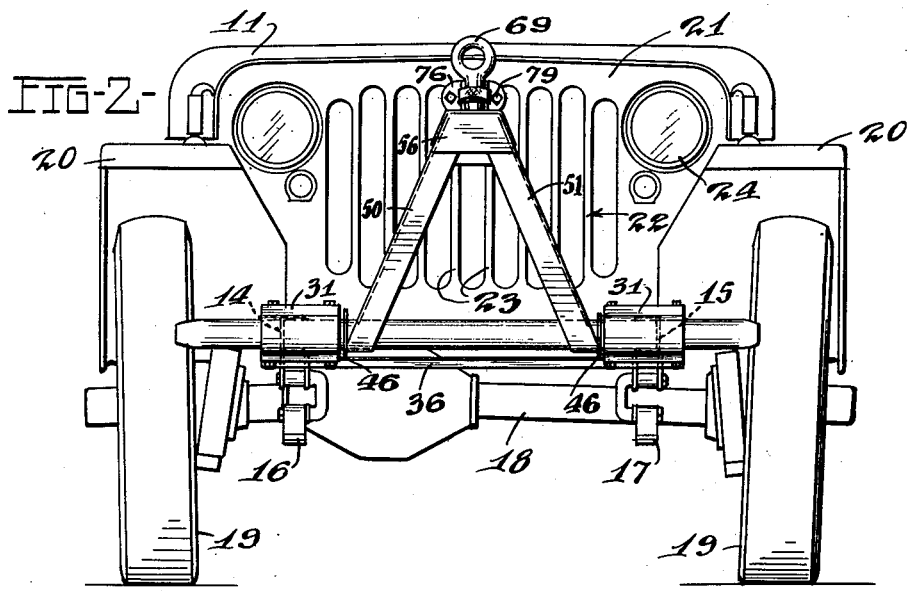
INVENTOR.
Delmar G. Roos
BY Harry O. Ernsberger
ATTORNEY June 19, 1945. D. G. ROOS 2,378,504
TOWING DEVICE
Filed Nov. 26, 1943 2 Sheets-Sheet 2
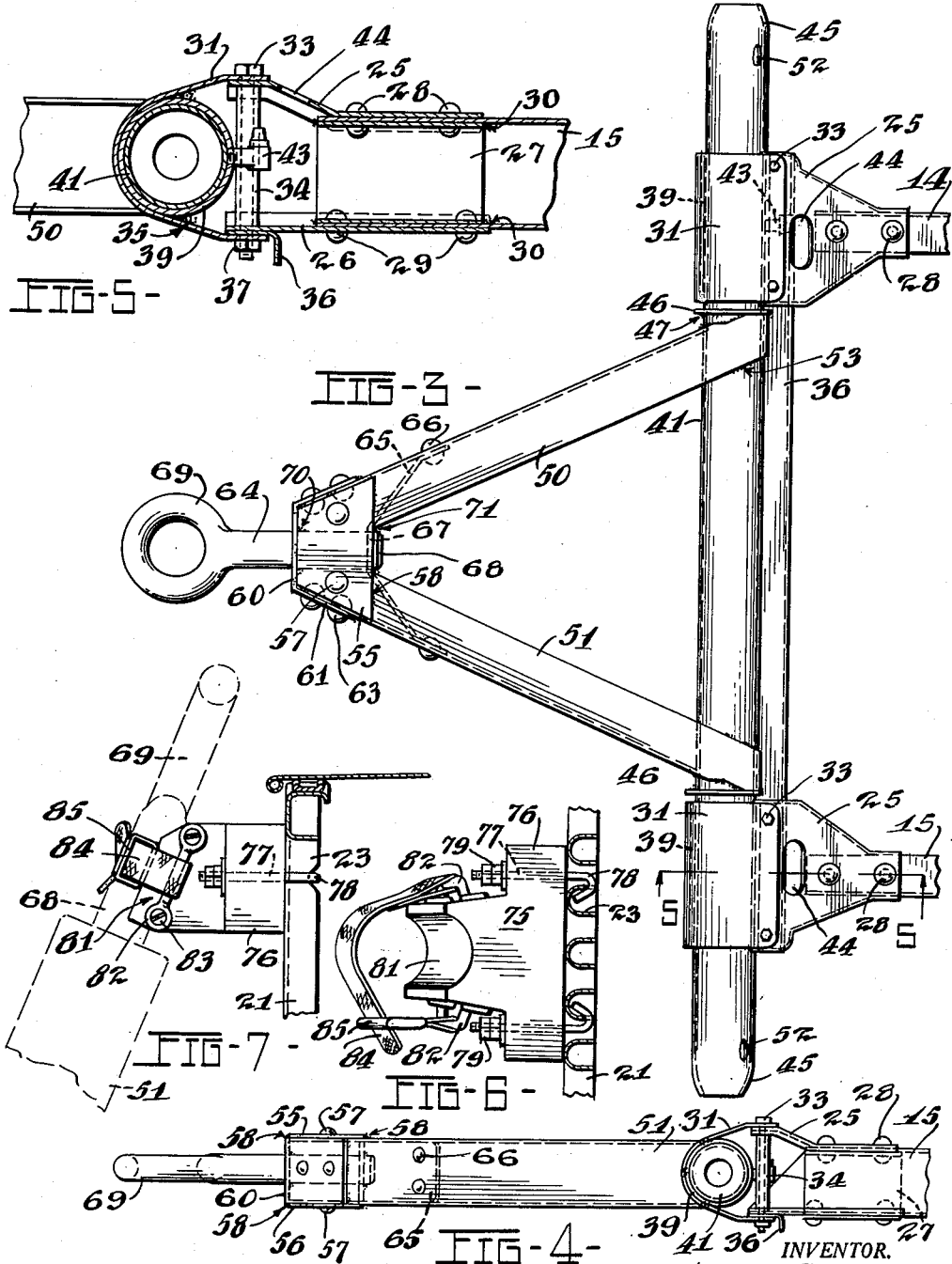
INVENTOR.
Delmar G. Roos
BY Harry O. Ernsberger
ATTORNEY Patented June 19, 1945

2,378,504

UNITED STATES PATENT OFFICE 2,378,504

TOWING DEVICE

Delmar G. Roos, Toledo, Ohio, assignor to Willys-Overland Motors, Inc., Toledo, Ohio, a corporation of Delaware Application November 26, 1943, Serial No. 511,883

10 Claims. (Cl. 280—33.14)

This invention relates to towing devices and more especially to a combination towing device and bumper or buffer bar construction for vehicles.

The invention comprehends the provision of a towing bar construction for use with a vehicle wherein the construction may be quickly and easily swung from a towing position to an "out-of-use" position.

The invention embraces an arrangement of a bumper bar construction having a towing means associated therewith, the bar being journally supported so as to facilitate the movement of the towing means to a position "out-of-use," in which position the bumper bar serves as a buffer for the vehicle.

A further object of the invention is the provision of a combination vehicle buffer construction and towing device which may be readily affixed to vehicles without modifying the vehicle construction to any substantial degree.

Another object of the invention resides in the provision of a vehicle towing arrangement which is of sturdy construction and one which is not liable to fail during use.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawings of a form of the invention, which may be preferred, in which:

Figure 1 is a side elevational view of a forward portion of a vehicle showing a form of my invention associated therewith;

Figure 2 is a front elevational view of the arrangement shown in Figure 1;

Figure 3 is a top plan view of the towing device;

Figure 4 is a side elevational view of the structure shown in Figure 3;

Figure 5 is a detail sectional view taken substantially on the line 5—5 of Figure 3.

Figure 6 is a top plan view showing a means of retaining the towing device in a position "out-of-use."

Figure 7 is a side elevational view of the arrangement illustrated in Figure 6.

While I have illustrated a form of my invention as incorporated in an automotive vehicle, it is to be understood that the arrangement of my invention may be utilized as a towing device for any type of vehicle construction.

Referring to the drawings in detail, and especially Figures 1 and 2, there is illustrated the forward portion of an automotive vehicle in which numeral 10 designates the side enclosure of an engine compartment having a hinged bonnet 11. The vehicle is inclusive of a frame construction having side frame members 14 and 15 of channel shape in cross section. Leaf springs 16 and 17 are secured to the frame members 14 and 15 and are secured intermediate their ends to a front axle housing construction 18 which encloses live axles (not shown) for driving road wheels 19 arranged at each end of the housing construction 18. Secured to the engine compartment enclosure 10 are fenders 20 projecting over the wheels 19. A member 21 having a grill-like portion 22 extends transversely of the vehicle and forward of the engine and serves as a guard for the vehicle radiator construction and headlamps 24. The member or guard 21 is preferably formed of sheet metal with a plurality of bars 23, substantially U-shaped in cross section, which construction lends strength and rigidity to the arrangement.

Secured to the forward portion of each of the frame members 14 and 15 are brackets 25 and 26, the ends of the frame members 14 and 15 being reinforced by means of gussets 27 welded to the frame members. The members 25 and 26 are secured to the frame members by means of rivets 28 and 29, and further strengthened by welding as at 30. Positioned forwardly of members 25 and 26 is a U-shaped element 31, the element 31 and brackets 25 and 26 having aligned openings adapted to receive securing bolts 33. Surrounding each of the bolts 33 is a spacer or tube 34 to hold the brackets 25 and 26 in proper spaced relationship. A bracing member 36 extends between the brackets 26 and is also provided with openings to receive the bolts 33, nuts 37 being threaded on each of the bolts to hold the assembly in proper relationship.

Positioned within and partially surrounded by element 31 is a sleeve or bearing member 39 which is welded or otherwise secured to the element 31 as at 35. The bearing member 39 rotatably supports a tubular bar 41 of circular cross section. The bearing surfaces of members 39 are suitably lubricated by means of a lubricant fitting 43 which is threaded into an opening in the bearing sleeve 39, the fitting being accessible for lubricating purposes through openings 44 formed in brackets 25. Positioned adjacent the inner ends of elements 31 and surrounding the tubular bar 41 are annulae 46 which are welded as at 47 to the exterior surface of bar 41 and serve as abutments to retain bar 41 against substantial endwise movement.

The towing arrangement is inclusive of a pair of struts or bars 50 and 51 preferably of channel shaped cross section which are convergedly arranged as shown in Figures 2 and 3. One end of each of the bars 50 and 51 is configurated so that the walls thereof take over the exterior surface of bar 41 and welded to the bar as at 53. The bars 50 and 51 are secured together adjacent the point of convergence by means of plates 55 and 56 which are riveted to the bars by means of rivets 57 and in addition welded as at 58 to the bars and to a cross member 60. The member 60 is formed with angularly projecting extremities 61 which are respectively secured to bars 50 and 51 by means of rivets 63. Another transverse member 65, having its end portions riveted to the bars 50 and 51 by means of rivets 66, has a central portion 67 arranged in substantial parallelism with the central portion of member 60. Members 60 and 67 are formed with aligned openings adapted to receive the shank 68 of a towing bar 64, the shank being welded to members 60 and 67 as at 70 and 61. The eye 69 formed in the towing member 64 is adapted to be engaged by a pin (not shown) or other coupling member carried by a vehicle engaged in the towing operation.

By the arrangement above described a very sturdy and substantial towing device is provided which will withstand severe stresses and shocks encountered in towing operations. Furthermore, the stresses taken by the draw bars or struts 50 and 51 are communicated to points adjacent the bearings 39 and the towing forces are thus transmitted directly to the side frame elements of the vehicle frame construction.

The arrangement of my invention is inclusive of means to secure the towing device in a position out-of-use or a stored position. To this end there is provided a pillow or block 75 formed with ears 76 which are bored to accommodate clamping bolts 77, each of which is formed with a hook-like portion 78 adapted to engage within the bight portions of the U-shaped bars 23 formed on the guard member 21 as shown in Figures 6 and 7. The block 75 is held in position upon the guard member 21 by means of nuts 79 threaded upon the clamping bolts 77. The block 75 is formed with a semi-cylindrical recess 81 which is adapted to accommodate the projecting portion of the shank 68 of the towing bar. Secured to each side of the pillow 75 are brackets 82 retained in position by means of screws 83 adapted to support a flexible strap 84.

When the towing device is not in towing position, the arrangement may be rotated in bearings 39 about the longitudinal axis of bar 31, which rotation brings the exposed shank portion 68 of the draw bar construction into the recess 81 formed at the pillow 75, after which the strap 84 may be drawn taut by means of the buckle 85, thus securing the towing device in out-of-use position as particularly illustrated in Figure 7. With the towing device in this position, the tubular bar 41 then functions as a buffer or bumper for the vehicle.

The outer extremities of the bar 41 are preferably reduced in size as illustrated at 45 for purposes of strength and appearance. The bar is provided adjacent each end with a comparatively small opening 52 so positioned that when the towing device is in stored or out-of-use position, the openings 52 will be at the lowermost point in tube 41 to permit water or foreign matter to drain out of the tube 41.

It is apparent that, within the scope of the invention, modifications and different arrangements may be made other than is herein disclosed, and the present disclosure is illustrative merely, the invention comprehending all variations thereof.

What I claim is:

1. In combination with a vehicle having a frame; a support mounted upon said frame; a buffer bar carried by said support; a pair of convergingly arranged struts secured to said buffer bar; means fixedly connecting said struts together; a towing element secured to the struts substantially at the point of convergence; said buffer bar being arranged for movement relative to said support whereby said towing element may be moved to a stored position.

2. In combination with a vehicle having a frame; a pair of brackets carried upon said frame; a buffer bar carried by said brackets; a pair of channel shaped members secured to said buffer bar; said channel shaped members being convergingly arranged; means including a plate connecting said members together; a towing element associated with said members; said buffer bar being arranged for relative movement to swing said towing element to a stored position, and means for releasably retaining said towing element in stored position.

3. In combination with a vehicle having a frame; a pair of brackets carried upon said frame; a buffer bar journaled on said brackets; a pair of struts secured to said buffer bar; means including a plate for securing said struts in fixed relationship, a towing element associated with the struts; said buffer bar being arranged for rotation to swing said towing element to a stored position, and means for releasably retaining said towing element in stored position.

4. In combiination with a vehicle having a frame; brackets secured to said frame; a tubular member journaled upon said brackets; a plurality of struts secured to said tubular member; transverse bars securing said struts in fixed relationship; a towing bar having an eye and shank portion; said shank portion being secured to said transverse bars; said tubular member being rotatable to move said towing bar and struts to a stored position.

5. In combination with a vehicle having a frame; brackets secured to said frame; a tubular member journaled upon said brackets; a plurality of struts welded to said tubular member; transverse bars securing said struts in fixed relationship; a towing bar having an eye and shank portion; said shank portion being secured to said transverse bars; said tubular member being rotatable to move said towing bar and struts to a stored position; a pillow secured to the vehicle and having a recess to receive the towing bar when the latter is in stored position, and means engageable with said pillow and towing bar for retaining said towing bar in stored position.

6. In combination with a vehicle having a frame; brackets secured to said frame; bearing members carried by said brackets; a tubular member journaled in said bearing members; a plurality of struts welded to said tubular member; transverse bars secured to said struts; a towing bar having an eye and shank portion;

said shank portion being secured to said transverse bars; said tubular member being rotatable in said bearing members to move said towing bar and struts to a stored position; a pillow secured to the vehicle and having a recess to receive the shank of the towing bar when the latter is in stored position, and releasable means engageable with said pillow and shank for retaining said towing bar in stored position.

7. In combination with a vehicle having a frame; brackets secured to said frame; bearing members carried by said brackets; a tubular member journaled in said bearing members; a plurality of channel shaped members having their end portions welded to said tubular member; transverse bars secured to said channel shaped members and having aligned openings therein; a towing bar having an eye and shank portion; said shank portion extending into the openings in said transverse bars and welded to said bars; said tubular member being rotatable in said bearing members to move said towing bar and channel shaped members to a stored position.

8. In combination with a vehicle having a frame; brackets secured to said frame; bearing members carried by said brackets; a tubular member journaled in said bearing members; a pair of channel shaped members having their end portions welded to said tubular member; transverse bars secured to said channel shaped members, and having aligned openings therein; a towing bar having an eye and shank portion, said shank portion extending into the openings in said transverse bars and welded to said bars; said tubular member being rotatable in said bearing members to move said towing bar and channel shaped members to a stored position; a pillow secured to the vehicle and having a recess to receive the shank of the towing bar when the latter is in stored position, and releasable means engageable with said pillow and shank for retaining said towing bar in stored position.

9. The combination with a vehicle frame, of a towing device including a pair of spaced supports secured to the frame, a member extending transversely of the vehicle frame and non-removably connected to said supports; a towing means secured to said member; said member being arranged for relative movement with respect to said supports whereby said towing means may be moved to a stored position, said member acting as a buffer for the vehicle when said towing means is in stored position.

10. The combination with a vehicle frame, of a towing device including spaced supports secured to the frame, a buffer bar extending transversely of the vehicle frame and non-removably carried by said supports; a towing means including convergingly arranged struts welded to said buffer bar at spaced points thereon; said towing means being arranged for relative swinging movement with respect to said supports whereby said towing means may be moved to a position of use or to a stored position, and means for retaining said towing means in a stored position.

DELMAR G. ROOS.